United States Patent [19]

Raj et al.

[11] Patent Number: 4,526,380
[45] Date of Patent: Jul. 2, 1985

[54] SINGLE POLE PIECE MULTIPLE-STAGE FERROFLUID SEAL APPARATUS

[75] Inventors: Kuldip Raj, Merrimack; Hanumaiah L. Gowda, Nashua, both of N.H.

[73] Assignee: Ferrofluidics Corporation, Nashua, N.H.

[21] Appl. No.: 574,358

[22] Filed: Jan. 27, 1984

[51] Int. Cl.³ .............................................. F16J 15/40
[52] U.S. Cl. ....................................... 277/80; 277/135
[58] Field of Search ................... 277/80, 135; 335/302, 335/306

[56] References Cited

U.S. PATENT DOCUMENTS 4,407,518 10/1983 Moskowitz et al. .................. 277/80

FOREIGN PATENT DOCUMENTS 655858 4/1979 U.S.S.R. ............................ 277/80

Primary Examiner—Robert I. Smith
Attorney, Agent, or Firm—Richard P. Crowley

[57] ABSTRACT

A single pole piece multiple-stage ferrofluid seal apparatus which comprises a non-permeable housing, an annular, axially polarized permanent magnet and a single pole piece on one side of the axially polarized permanent magnet and a magnetically permeable bearing assembly, such as a ball bearing assembly on the opposite side of the permanent magnet and a shaft extending through the housing with one end of the pole piece extending into a close, non-contacting relationship with the surface of the shaft, so as to form at the one end of the pole piece or on the surface of the shaft a plurality of separately spaced apart knife edges to define a plurality of spaced apart radial gaps and ferrofluid disposed in the radial gaps to define a plurality of spaced apart ferrofluid O-ring seals about the shaft surface, with the magnetic flux circuit passing between the permanent magnet, the pole piece, the radial gaps, the shaft, and the bearing assembly.

13 Claims, 3 Drawing Figures

SINGLE POLE PIECE MULTIPLE-STAGE FERROFLUID SEAL APPARATUS

BACKGROUND OF THE INVENTION

Ferrofluid seal apparatuses are known for sealing rotary shaft elements, such as for use as an exclusion-type seal or as a pressure capacity-type seal. Such ferrofluid seal apparatus provides an effective seal between different environments, either at the same or at different pressure, or having the same or different environments.

A ferrofluid exclusion-type single stage, single pole piece seal apparatus is described in U.S. Pat. No. 4,407,508, Issued Oct. 4, 1983, wherein a single pole piece and a single annular permanent magnet are employed to provide a single stage exclusion-type seal wherein the magnetic flux circuit is completed through an air gap between one end of the permanent magnet and the shaft element to be sealed. A multiple stage pressure capacity-type ferrofluid seal apparatus is described, for example, in U.S. Pat. No. 3,620,584, Issued Nov. 16, 1971, which patent describes a multiple-stage ferrofluid seal apparatus employing an annular permanent magnet and a plurality of separate spaced apart ferrofluid O-ring seals extending about the surface of the shaft element to be sealed, each seal providing its own defined pressure capacity and employing two pole pieces, one on either side of the annular permanent magnet. In addition, magnetic bearing systems, such as a ball bearing, have been used to support a rotary shaft and to permit the low friction rotation thereof and employed ferrolubricants retained within the confines of the inner and outer race of the ball bearing assembly, such as, for example, described in U.S. Pat. No. 3,977,739, Issued Aug. 31, 1976.

It is desirable to provide a pressure capacity-type ferrofluid seal apparatus which is more compact than conventional, multiple-stage ferrofluid seal apparatus, and which seal apparatus may be constructed at lower cost with the use of lower magnetic power consumption and yet have the same or substantially the same pressure capacity, as required in the prior art ferrofluid seal apparatus.

SUMMARY OF THE INVENTION

The invention relates to a single pole piece multiple-stage ferrofluid seal apparatus and method, and more particularly to a low cost, compact, single pole piece, multiple-stage ferrofluid seal apparatus and system containing bearings wherein the magnetic flux circuit is completed through the bearing system.

A single pole piece multiple-stage ferrofluid seal apparatus has been discovered which is a more compact than conventional multiple-stage ferrofluid seal in that the axial length of the seal apparatus is less than conventional ferrofluid seals. In addition, the ferrofluid seal apparatus of the invention employs only half the power consumption of the prior art ferrofluid seal apparatus, while by completing the magnetic flux circuit through adjacent magnetic permeable bearings on one or both sides of the ferrofluid seal apparatus, the pressure capacity of the single pole piece multiple-stage ferrofluid seal apparatus of the invention is equivalent or substantially equivalent to the pressure capacity of one pole piece of the conventional prior art ferrofluid seal. This pressure capacity generally is more than enough pressure capacity for many applications, wherein a pressure difference exists between one and the other side of the ferrofluid seals, such as for example, applications wherein one region is at atmospheric pressure and the other region is at subatmospheric pressure. The employment of a single pole piece not only reduces the axial length of the seal, but also reduces the cost of the ferrofluid seal apparatus. The overall cost of the ferrofluid seal apparatus is reduced in that the magnetic flux circuit is completed through one or two bearing systems adjacent the ferrofluid seal apparatus, which permits the elimination of the second pole piece conventionally required in multiple-stage, pressure capacity-type ferrofluid seal apparatus.

The single pole piece multiple-stage ferrofluid seal apparatus comprises a magnetically permeable rotary shaft element to be sealed, a non-magnetic permeable housing through which the shaft element extends, and an annular, axially polarized permanent magnet in the housing and having a one on the other end and surrounding the shaft element to be sealed. The seal apparatus employs a single pole piece having a one and the other end, one end of the pole piece in a magnetic flux relationship with one end of the permanent magnet and typically adjacent to and in direct contact with the one end of the permanent magnet and surrounding the shaft element, while the other end of the pole piece extends into a close, non-contacting relationship to the surface of the shaft element. A plurality of separate spaced apart radial gaps are formed between the other end of the pole piece and the surface of the shaft element, either by a series of knife edges or serrations on the end of the pole piece or on the opposite surface of the shaft element or on both surfaces.

A ferrofluid, such as a low volatility hydrocarbon or ester ferrofluid; for example, having a viscosity of 100 to 2000 cps and a magnetic gauss of 100 to 1000; for example, 200–500 gauss is retained in the plurality of the radial gaps through the magnetic flux lines from the annular permanent magnet. The ferrofluid retained in the separate spaced apart gaps forms a plurality of separate spaced apart, O-ring seals about the surface of the shaft element. In the ferrofluid seal apparatus only a single pole piece is employed in combination with the annular permanent magnet. The ferrofluid seal apparatus also includes a magnetically permeable bearing means adjacent one or the other or both sides of the permanent magnet and within the non-magnetic permeable housing in order to provide a means to complete the magnetic circuit. Typically, the magnetically permeable bearing means is employed on one or both sides to support the shaft element and the bearing means in a magnetically flux generally contacting relationship with the end of the axially polarized permanent magnet, thus, permitting the elimination of the usual second pole piece in a multiple-stage ferrofluid seal.

The magnetically permeable bearing employed may generally comprise an inner and outer race element and a rolling element therebetween, such as ball bearings, in a cage retaining means for the roller elements, and with the inner and outer race secured for rotation relative to each other. Typically, the inner race is secured to the outer surface of the shaft element. The bearing system to be employed should be sufficiently magnetically permeable to complete the magnetic flux circuit, although all parts of the magnetic system need not be magnetically permeable, but sufficient parts, such as the ball bearings or the inner or outer races, typically made of metal, so that the ball bearing assembly provides a magnetic flux path. Generally, ball bearing systems are supportingly employed on either side of the ferrofluid seal and so the magnetic flux lines may pass through one or both magnetically permeable bearing systems as desired, or the flux path may be passed through a single bearing system adjacent one end of the annular permanent magnet. If another bearing system is employed on the opposite side, generally a non-magnetic spacing means is employed, such as an aluminum-type washer, in order to provide magnetic insulation between the single pole piece and the other bearing system, unless the other bearing system is non-magnetic. The other bearing system, of course, may be magnetically permeable or non-magnetically permeable. The magetically permeable bearing system is generally employed in a contacting relationship with the outer periphery of the annular, axially polarized magnet with a small annular air space extending radially outward from the surface of the shaft element, so as to provide for contact between the annular permanent magnet and the magnetically permeable ball bearing system at the outer peripheral radius of the permanent magnet.

The invention will be described for the purposes of illustration only in connection with certain embodiments; however, it is recognized that those persons skilled in the art may make various changes, modifications, and improvements therein all falling within the spirit and scope of the present invention.

DESCRIPTION OF THE EMBODIMENTS

Figure 1:
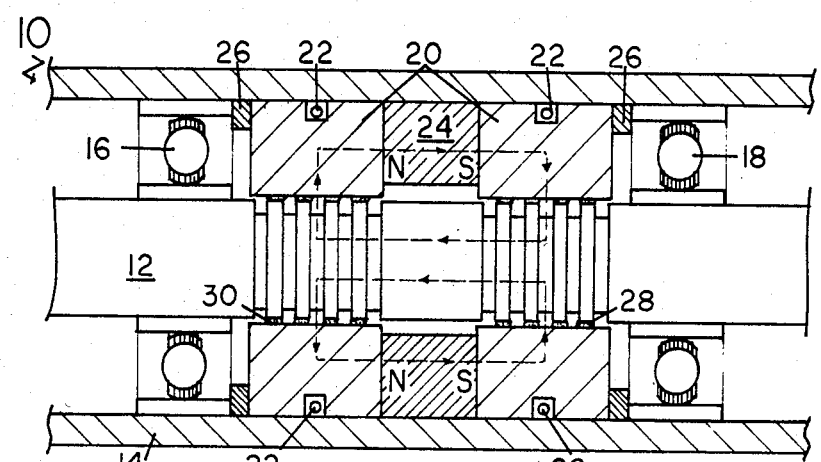
FIG. 1 is a schematic sectional illustration of a conventional dual pole piece, multiple-stage ferrofluid seal apparatus.

FIG. 1 illustrates a prior art vacuum-type ferrofluid system 10 composed of a magnetically permeable rotary shaft 12, a non-magnetic housing 14, and a pair of ball bearings 16 and 18 to support the shaft 12, with the inner race secured to the outer surface of the shaft 12. An annular, axially polarized permanent magnet 24 is employed and on either side are first and second pole pieces 20. The one end of the pole pieces forming a plurality of radial gaps with the surface of the shaft element 12 to define a plurality of separate, ferrofluid, O-ring seals 28 and 30 about the surface of the shaft element. The ball bearings are typically magnetically permeable; and therefor, a spacer 26 of non-magnetic material is employed to insulate the ball bearings 16 and 18 from the dual pole piece ferrofluid multiple-stage seal. In the conventional seal 10, the magnetic flux circuit is completed through the shaft, the pole pieces, the permanent magnet and the ferrofluid in the multiple-radial gaps, as illustrated in the dotted lines shown in the drawing. Due to the high concentration of magnetic flux lines in the radial gaps between the pole pieces and the shaft, the ferrofluid is retained in separate stages, the number of stages depending upon the pressure capacity desired of the multiple stage seal. These ferrofluid O-rings provide a hermetic barrier; for example, between a vacuum on one side of the ferrofluid seal and; for example, the atmosphere on the other side. The pressure capacity of the ferrofluid seal is a function of the magnetic flux density in the radial gaps, the number of stages employed, and the saturization magnetization of the ferrofluid. The gasket-type O-ring seal 22 is employed as a static seal between the housing 14 and the pole pieces 20.

Figure 2:
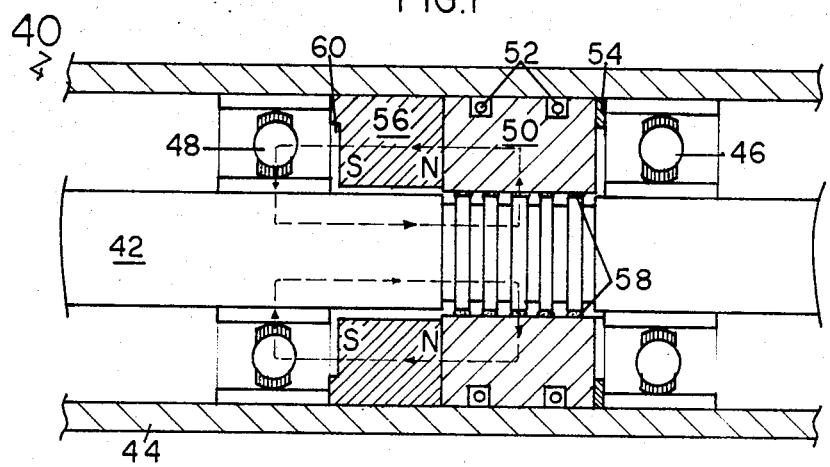
FIG. 2 is a schematic illustrative half sectional view of a single pole piece, multiple-stage ferrofluid seal apparatus of the invention.

FIG. 2 is an illustrative half sectional view of the ferrofluid seal apparatus of the invention which shows a low cost ferrofluid single pole piece, multiple-stage ferrofluid seal, such as a vacuum rotary seal of reduced size; that is axial length, and low cost. The ferrofluid seal system 40 comprises a shaft 42 which is composed of a magnetically permeable material mounted within a non-magnetic housing 44 and mounted on a pair of bearings 46 and 48, typically ball bearings, which are magnetically permeable, for example, ball bearing system 48 composed of a metal inner and outer race and metal ball bearings and cage elements. The apparatus 40 includes a single annular pole piece 50 sealed within the housing 44 by O-ring gaskets 52. An annular spacer element composed of a non-magnetic material, such as an aluminum 54 is employed to insulate the ball bearing 46 from the single pole piece where the ball bearing 46 represents a magnetically permeable material. An annular permanent magnet 56 is employed which surrounds the shaft element 42, the single pole piece 50 is in a magnetic flux relationship and direct contact with one end of the axially polarized permanent magnet 56. A plurality of radial gaps is formed under the one end of the pole piece between the one end of the pole piece and on the surface of the shaft element as illustrated. In this case, the edges are formed on the shaft element to define a plurality of separate spaced apart ferrofluid O-ring seals 58 which define the pressure capacity of the system 40. A radial extending air space 60 extends between the annular permanent magnet 56 and the magnetically permeable ball bearings 48, with the ball bearings in direct contact and in a magnetic flux relationship with the exterior peripheral surface of the annular permanent magnet 56.

As illustrated, the ferrofluid seal system of FIG. 2 requires only a single pole piece and the magnetic flux circuit shown in the figure through dotted lines is completed through the shaft 42, the pole piece 50, the permanent magnet 56, the magnetically permeable ball bearings 48, and the ferrofluid 58 in the radial gaps. Due to the magnetic flux concentration in the multiple stages, the ferrofluid O-rings will be formed in the radial gaps and act as a rotary multiple-stage seal. The overall cost of the ferrofluid seal illustrated will be less than the conventional prior art seal of FIG. 1, in that the magnetic flux circuit is being completed through one of the bearings which eliminates a second pole piece. The size of the seal in axial length is less than that of the conventional seal with the additional advantage that the power consumption of the ferrofluid seal is half of that of the conventional seal. Completion of the magnetic flux circuit through the bearing 46 adjacent one side of the ferrofluid seal provides for a pressure capacity of the ferrofluid seal which is generally equivalent to the pressure capacity of one pole piece of the conventional seal. For example, as illustrated, the pressure capacity of the seal is illustrated in FIG. 1 with five stages would range from about 15 to 35 psi which is fully adequate for most vacuum sealing systems.

Figure 3:
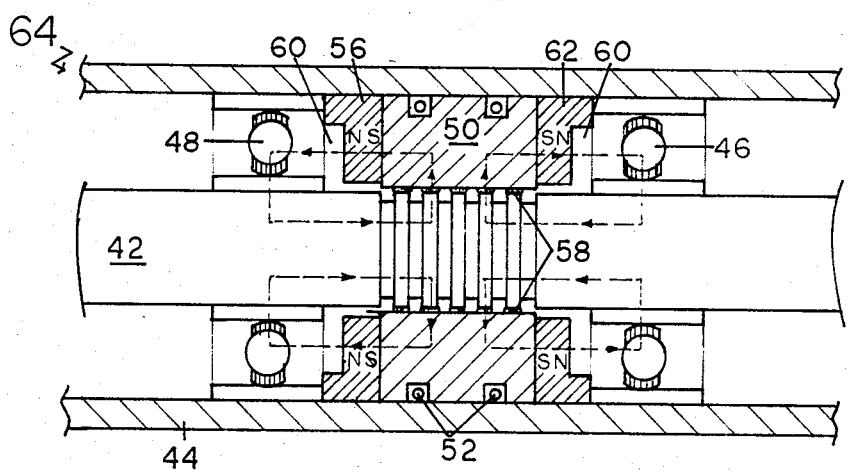
FIG. 3 is a schematic illustrative half sectional view of another embodiment a single pole piece multiple-stage ferrofluid seal apparatus of of the invention.

FIG. 3 is an schematic half sectional view of a ferrofluid seal apparatus 64 and represents another embodiment of the seal apparatus of FIG. 2. The ferrofluid seal apparatus 64 now comprises two annular, axially polarized permanent magnets 56 and 62. The seal apparatus represents a low cost single pole piece multiple-stage vacuum seal with a higher pressure capacity than the seal of FIG. 1. The ferrofluid seal 64 is similar to the seal of FIG. 2 except that there are two axially polarized magnets used in the magnetic circuit and the magnetic flux path rather than being completed through one of the adjacent magnetic permeable ball bearings 48 is now completed through both adjacent bearings 46 and 48. This seal permits a higher pressure capacity to employed where desired due to the higher flux density existing across the entire length of the radial gap of the ferrofluid 58 between the single pole piece 50 and the shaft 42. Like the seal apparatus 40 of FIG. 2, this seal apparatus 64 has low power consumption and reduction in the actual length of the seal by the employment of a single pole piece. Further and advantageously, the magnetic flux in the bearing leads to some degree of preloading which helps to reduce or eliminate any seal bursting phenomenon. The efficiency of the magnetic circuit is high for the same volume of the magnetic material used as compared with the seal of FIG. 2. As illustrated, the completion of the magnetic flux is shown by dotted lines in the drawing. The employment of two annular permanent magnets, one on each side of the single pole piece, permits a higher pressure capacity in that all the stages are then placed in full pressure capacity and by full saturization of the ferrofluid there is no pressure gradient which may exist in the seal of FIG. 2. The seal of FIG. 3 with a permanent magnet on either side, together with magnetic permeable bearings on each side ensures full pressure capacity which would range; for example, from 15 to 50 psi; for example, 15-35 psi.

What is claimed is:

1. A single pole piece multiple-stage ferrofluid seal apparatus which comprises:
   (a) a magnetically permeable rotary shaft element;
   (b) a non-magnetic permeable housing through which housing the shaft element extends;
   (c) an annular axially-polarized permanent magnet in the housing and having a one and another end and the annular permanent magnet surrounding the surface of the shaft element;
   (d) a single pole piece having a one and another end, one end in a magnetic flux relationship with the one end of the permanent magnet and the other end of the pole piece extending into a close, non-contacting relationship with the surface of the shaft element and the one end of the single pole piece or the surface of the shaft element defining a plurality of separate edges which define a plurality of separate spaced apart radial gaps;
   (e) a magnetically permeable bearing means to support the shaft element, the bearing means directly adjacent to and in a magnetic flux relationship with the other end of the permanent magnet;
   (f) ferrofluid retained in the plurality of the radial gaps by the magnetic flux from the permanent magnet to form a plurality of spaced apart separate ferrofluid O-ring seals about the surface of the shaft element; and
   (g) the magnetic flux circuit passing between the permanent magnet, the single pole piece, the radial gaps, the shaft, and the adjacent bearing means to provide a single pole piece multiple-stage ferrofluid seal apparatus.

2. The apparatus of claim 1 wherein the bearing means comprises a ball bearing means composed of an inner and outer race and a plurality of ball bearings and cage means to retain the ball bearings within the inner and outer race.

3. The apparatus of claim 1 which includes a non-magnetic spacing means at the other end of the single pole piece and bearing means adjacent the non-magnetic spacing means to support the shaft element.

4. The apparatus of claim 1 characterized by an annular air space extending between the permanent magnet and the bearing means, which air space extends radially outward from the surface of the shaft element with the bearing means in contact with the radial periphery of the permanent magnet.

5. The apparatus of claim 1 which includes a second annular axially-polarized permanent magnet in the housing and having a one end and another end and surrounding the shaft element with the one end of the second permanent magnet in a magnetic flux relationship with the other end of the single pole piece and which includes a second magnetic permeable bearing means to support the shaft element, the second bearing means in a magnetic flux relationship with the other end of the second permanent magnet and wherein the magnetic flux circuit extends between the single pole piece, the first permanent magnet, the first bearing means, the shaft element and at least some of the ferrofluid in the radial gaps and the second magnetic flux circuit extends between the single pole piece, the second permanent magnet, the second bearing means, the shaft element, and at least some of the ferrofluid in the radial gaps.

6. The apparatus of claim 5 wherein the second bearing means comprises a ball bearing means composed of an inner and outer race and a plurality of ball bearings and cage means to retain the ball bearings within the inner and outer race.

7. The apparatus of claim 5 characterized by a first and second annular air space extending between the first and second permanent magnet and the first and second bearing means respectively, which air space extends radially outward from the surface of the shaft element with the first and second bearing means in contact respectively with the radial periphery of the first and second magnet.

8. A single pole piece multiple-stage ferrofluid seal apparatus which comprises:
   (a) a magnetically-permeable rotary shaft element to be sealed;
   (b) a non-magnetic permeable housing through which housing the shaft element extends;
   (c) a first and a second annular, axially-polarized permanent magnet, each having a one and another axial end and each surrounding the shaft element;
   (d) a single pole piece having a one and another radial end, one end in a magnetic flux relationship with the one end of the first permanent magnet on one side and the one end in a magnetic flux relationship with the one end of the second permanent magnet on the opposite side, and the other end of the pole piece extending into a close non-contacting relationship with the surface of the shaft element to define at the other end of the pole piece or on the surface of the shaft element a plurality of spaced apart edges which define a plurality of separate spaced apart radial gaps therebetween;
   (e) ferrofluid retained in the plurality of radial gaps by the magnetic flux from the first and second permanent magnets to form a plurality of spaced part ferrofluid seals about the surface of the shaft element;

(f) magnetically permeable first and second bearing means to support the shaft element, the first bearing means adjacent to and in a magnetic flux relationship with the other end of the first permanent magnet and the second bearing means adjacent to and in a magnetic flux relationship with the other end of the second permanent magnet; and (g) the magnetic flux extending between the first pole piece, the first permanent magnet, the first bearing means, the shaft, and at least some of the ferrofluid in the radial gaps and the first pole piece, the second permanent magnet, the second bearing means, the shaft element, and at least some of the ferrofluid in the radial gaps.

9. The apparatus of claim 8 which includes an annular air space between the first bearing means and the first magnet means and the second bearing means and the second magnet means, the air space extending radially outward from the surface of the shaft element with the first bearing means and the first permanent magnet and the second bearing means and the second permanent magnet in a magnetic flux contacting relationship about the exterior radial periphery and first and second permanent magnets.

10. The apparatus of claim 9 wherein the first and second bearing means comprise ball bearing means.

11. A single pole piece multiple-stage ferrofluid seal apparatus which comprises:

(a) a magnetically permeable rotary shaft element;

(b) a non-magnetic permeable housing through which housing the shaft element extends;

(c) a single annular pole piece about the shaft element and having a one and other end, one end extending into a close, noncontacting relationship with the surface of the shaft element and the one end of the pole piece or the surface of the shaft element defining a plurality of separate edges to form a plurality of radial gaps, the other end of the single pole piece sealed to the housing;

(d) a first and a second annular permanent magnet surrounding the shaft element, the first magnet on the one side and the second magnet on the other side of the single pole piece and in a close contacting magnetic flux relationship therewith;

(e) a first and a second magnetically permeable ball bearing means to support the shaft element, the first bearing means on the one side of the first magnet and the second bearing means on the other side of the second magnet and in a close contacting magnetic flux relationship therewith;

(f) ferrofluid retained in the plurality of radial gaps by the magnetic flux of the first and second magnets to form a plurality of spaced apart separate ferrofluid seals about the surface of the shaft element; and (g) the magnetic flux circuits passing between the first magnet, the single pole piece, the first bearing means, the ferrofluid in the radial gaps, and the shaft element and the second magnet, the single pole piece, the second bearing means, ferrofluid in the radial gaps, and the shaft element thereby providing a high-efficiency multiple stage ferrofluid seal apparatus with all ferrofluid seal stages are at full pressure capacity and the ferrofluid at full magnetic saturation with no pressure gradient across the ferrofluid.

12. The apparatus of claim 11 wherein the first and second permanent magnets are in respective contact with the exterior periphery of the first and second bearing means and provide an annular air gap about the shaft element between the first and second magnets and the first and second bearing means.

13. The apparatus of claim 11 wherein the first and second magnets are axially polarized magnets.

* * * * *